US011816871B2

United States Patent
Kwong et al.

(10) Patent No.: US 11,816,871 B2
(45) Date of Patent: Nov. 14, 2023

(54) REAL-TIME LOW LATENCY COMPUTER VISION/MACHINE LEARNING COMPUTE ACCELERATOR WITH SMART CONVOLUTIONAL NEURAL NETWORK SCHEDULER

(71) Applicants: Advanced Micro Devices, Inc., Santa Clara, CA (US); ATI Technologies ULC, Markham (CA)

(72) Inventors: Tung Chuen Kwong, Markham (CA); David Porpino Sobreira Marques, Markham (CA); King Chiu Tam, Markham (CA); Shilpa Rajagopalan, Markham (CA); Benjamin Koon Pan Chan, Markham (CA); Vickie Youmin Wu, Santa Clara, CA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 203 days.

(21) Appl. No.: 17/138,817

(22) Filed: Dec. 30, 2020

(65) Prior Publication Data

US 2022/0207783 A1    Jun. 30, 2022

(51) Int. Cl.
  *G06T 9/00* (2006.01)
  *G06N 3/02* (2006.01)
  *G06T 3/40* (2006.01)

(52) U.S. Cl.
  CPC .............. *G06T 9/002* (2013.01); *G06N 3/02* (2013.01); *G06T 3/4046* (2013.01)

(58) Field of Classification Search
  CPC .......... G06T 9/002; G06T 3/4046; G06N 3/02
  See application file for complete search history.

(56) References Cited

U.S. PATENT DOCUMENTS

| 8,345,984 B2 * | 1/2013 | Ji | G06V 40/20 |
| | | | 382/156 |
| 2011/0207489 A1 * | 8/2011 | DeLuca | H04W 72/1205 |
| | | | 455/509 |

(Continued)

FOREIGN PATENT DOCUMENTS

| CN | 110851255 A | * | 2/2020 | .......... G06F 9/4843 |
| CN | 113439262 A | * | 9/2021 | .......... G05B 13/027 |

(Continued)

OTHER PUBLICATIONS

H.-I. Wu, D.-Y. Guo, H.-H. Chin and R.-S. Tsay, "A Pipeline-Based Scheduler for Optimizing Latency of Convolution Neural Network Inference over Heterogeneous Multicore Systems," 2020 2nd IEEE International Conference on Artificial Intelligence Circuits and Systems (AICAS), 2020, pp. 46-49, doi: 10.*

*Primary Examiner* — Charles T Shedrick
(74) *Attorney, Agent, or Firm* — Volpe Koenig

(57) ABSTRACT

Methods and devices are provided for processing image data on a sub-frame portion basis using layers of a convolutional neural network. The processing device comprises memory and a processor. The processor is configured to receive frames of image data comprising sub-frame portions, schedule a first sub-frame portion of a first frame to be processed by a first layer of the convolutional neural network when the first sub-frame portion is available for processing, process the first sub-frame portion by the first layer and continue the processing of the first sub-frame portion by the first layer when it is determined that there is sufficient image data available for the first layer to continue processing of the first sub-frame portion. Processing on a sub-frame portion basis continues for subsequent layers such that processing by a layer can begin as soon as sufficient data is available for the layer.

21 Claims, 5 Drawing Sheets

(56) References Cited

U.S. PATENT DOCUMENTS

2020/0293866 A1\* 9/2020 Guo .................... G06F 16/9024
2021/0295139 A1\* 9/2021 Kolhe ................... G06F 9/5077
2022/0083390 A1\* 3/2022 Jo ......................... G06F 1/3234

FOREIGN PATENT DOCUMENTS

| GB | 2560219 A | \* | 9/2018 | ............. G06N 20/00 |
|----|-----------|---|--------|------------------------|
| WO | WO-2018218249 A1 | \* | 11/2018 | ........... G06N 3/0445 |
| WO | WO-2020073742 A1 | \* | 4/2020 | ............. G06F 9/485 |

\* cited by examiner

REAL-TIME LOW LATENCY COMPUTER VISION/MACHINE LEARNING COMPUTE ACCELERATOR WITH SMART CONVOLUTIONAL NEURAL NETWORK SCHEDULER

BACKGROUND

Computer vision (CV) is burgeoning technology field which includes techniques for assisting computers to gain an understanding of (e.g., perform inference on) the content of images (i.e., image data). Combining the use of real-time, low latency CV inference with conventional CV algorithms is growing in importance to industries (e.g., automotive industry and gaming industry) for image processing of time sensitive applications, such as applications used for virtual reality, augmented reality, head-mount displays, automotive perception systems and advanced driver assistance systems.

BRIEF DESCRIPTION OF THE DRAWINGS

A more detailed understanding can be had from the following description, given by way of example in conjunction with the accompanying drawings wherein.

DETAILED DESCRIPTION

Figure 1:
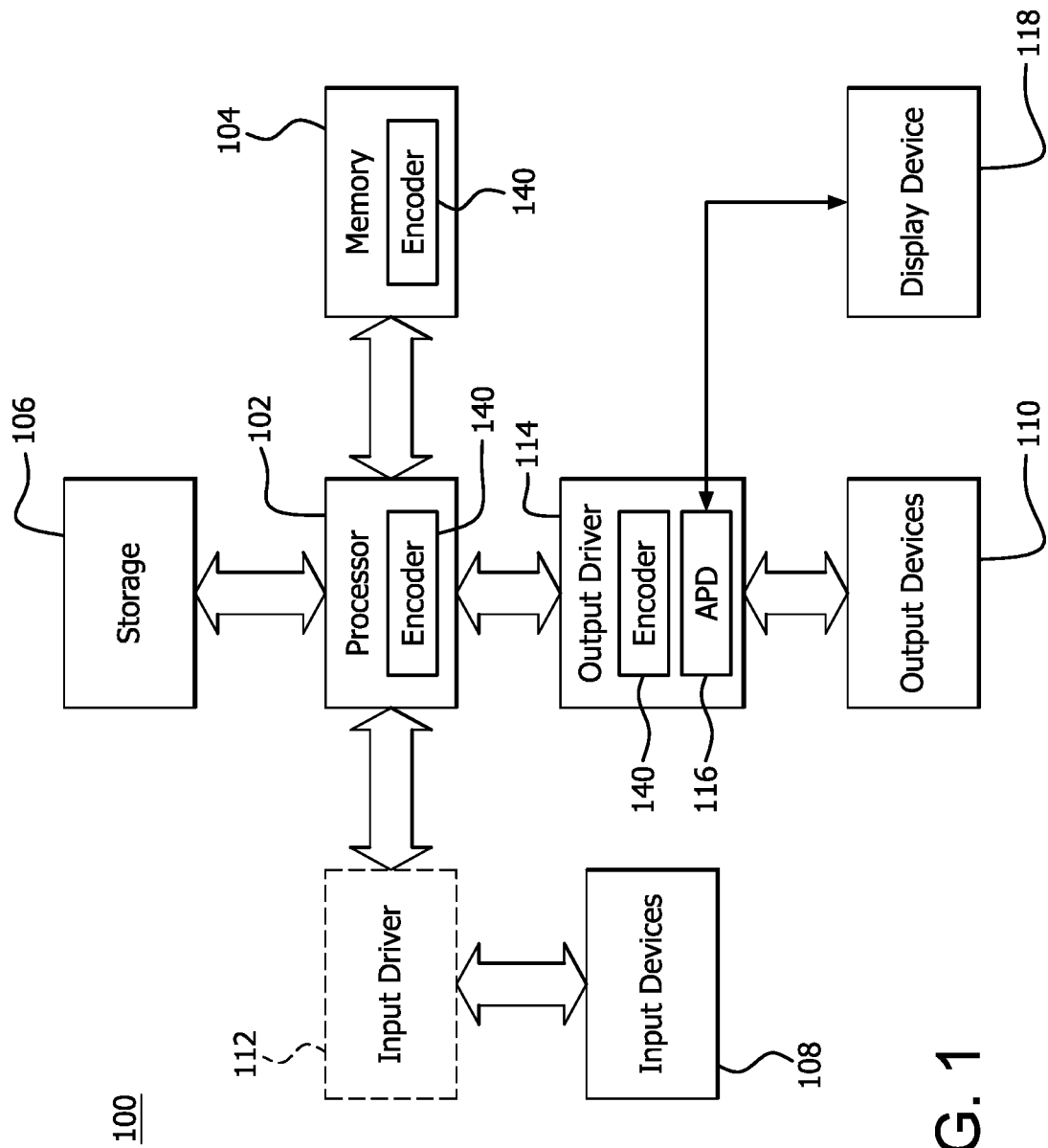
FIG. 1 is a block diagram of an example device in which one or more features of the disclosure can be implemented.

Processing latency in image processing refers to the amount of time (delay) incurred from when the image data is available for processing to when the available image data is processed. The negative impact of processing latency (e.g., photon-to-photon latency) is highly detrimental to the effectiveness of time sensitive applications. Conventional CV systems employ techniques to reduce the processing latency for time sensitive applications by dividing frame (image) data into smaller portions (e.g., slices or tiles) of the frame and processing the portions of the frame when they become available for processing from upstream sources. Accordingly, the processing latency incurred during processing of these time sensitive applications is reduced by processing the portion of frame data (e.g., slice or tile) that is available rather than waiting for the whole frame to be available for processing.

Convolutional neural networks (CNNs) are useful in image processing because they are efficient in reducing the number of image parameters without reducing image quality. Conventional CNN systems attempt to reduce processing latency using techniques such as spatial distribution and quantization and architecture designed to take advantage of parameters, such as activation, weight and locality. For example, some conventional CNN processing systems support full frame spatial distribution to improve overall throughput. These conventional systems do not, however, provide temporal scheduling for reducing overall photon-to-photon latency. Other conventional CNN systems schedule processing of tensors layer by layer based on a directed acyclic graph (DAG) of the network. These conventional systems do not, however, mesh well with low latency computer vision algorithms capable of operating on sub-tensor level (e.g. slice level or tile level), causing existing low level computer vision algorithms to operate as standard latency algorithms.

That is, these conventional CNN processing systems cannot, and do not, process the data on a sub-frame portion (e.g., slices or tiles). Accordingly, these conventional CNN processing systems the inference output of a CNN is provided after a full frame of data is available, resulting in increased processing latency.

Features of the present disclosure provide devices and methods which reduce processing latency by scheduling the processing of a sub-frame portion of a frame (e.g., slice or tile of a frame) when the sub-frame portion is available for processing (e.g., when the data for each pixel of the sub-frame portion is in memory). Accordingly, the amount of time incurred to produce the inference output data for the frames is less than the amount of time incurred to produce the inference output data when the image data is processed by layers of the CNN on a frame basis.

Processing of the image data on a sub-frame portion basis and reduction of the processing latency of applications is facilitated by additional communications between a scheduler and processing units (e.g., compute units) of an accelerated processing device, which are implemented as two separate hardware blocks. The additional communications include an indication of availability of input data provided from the scheduler to a processing unit and an indication of the availability of output data provided from a compute unit to the scheduler. Overall system latency is reduced by scheduling operations across layers, on a sub-frame portion (e.g., slice or tile) basis, based on the incremental availability of incoming data.

An image processing method is provided which comprises receiving a plurality of frames of image data, the frames comprising sub-frame portions of image data, scheduling a first sub-frame portion of a first frame to be processed by a first layer of a convolutional neural network when the first sub-frame portion is available for processing, processing the first sub-frame portion by the first layer and continuing the processing of the first sub-frame portion by the first layer when it is determined that there is sufficient image data available for the first layer to continue processing of the first sub-frame portion.

An image processing device is provided which comprises memory and a processor. Th processor is configured to receive a plurality of frames of image data which comprise sub-frame portions of image data, schedule a first sub-frame portion of a first frame to be processed by a first layer of a convolutional neural network when the first sub-frame portion is available for processing, process the first sub-frame portion by the first layer and continue the processing of the first sub-frame portion by the first layer when it is determined that there is sufficient image data available for the first layer to continue processing of the first sub-frame portion.

A non-transitory computer readable medium is provided which comprises instructions for causing a computer to execute a video encoding method comprising receiving a plurality of frames of image data, which comprise sub-frame portions of image data, scheduling a first sub-frame portion of a first frame to be processed by a first layer of a convolutional neural network when the first sub-frame portion is available for processing, processing the first sub-frame portion by the first layer and continuing the processing of the first sub-frame portion by the first layer when it is determined that there is sufficient image data available for the first layer to continue processing of the first sub-frame portion.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. As shown in FIG. 1, the output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. In addition to processing compute and graphics rendering commands and providing pixel output to display device 118, APD 116 may also control the encoder 140 for encoding video images according to features of the disclosure. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

A video encoder 140 is shown in two different alternative forms. In a first form, the encoder 140 is software that is stored in the memory 104 and that executes on the processor 102 as shown. In a second form, the encoder 140 is at least a portion of a hardware video engine (not shown) that resides in output driver 114. In other forms, the encoder 140 is a combination of software and hardware elements, with the hardware residing, for example, in output drivers 114, and the software executed on, for example, the processor 102.

Figure 2:
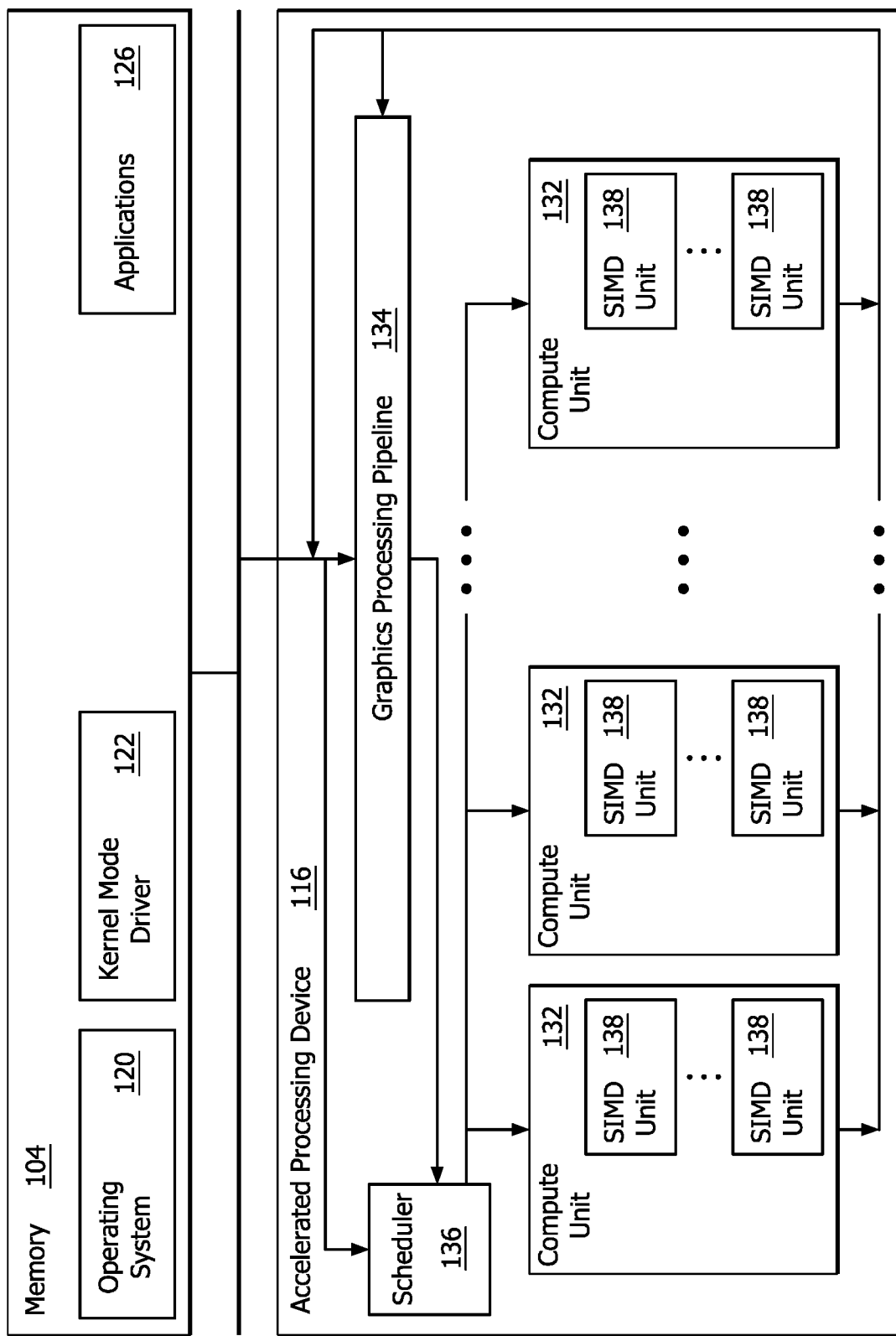
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138. For example, scheduler 136 is used to schedule processing of image data on a sub-frame portion (e.g., slice or tile) basis.

The parallelism afforded by the compute units 132 is suitable for graphics related operations such as pixel value calculations, vertex transformations, and other graphics operations. Thus, in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
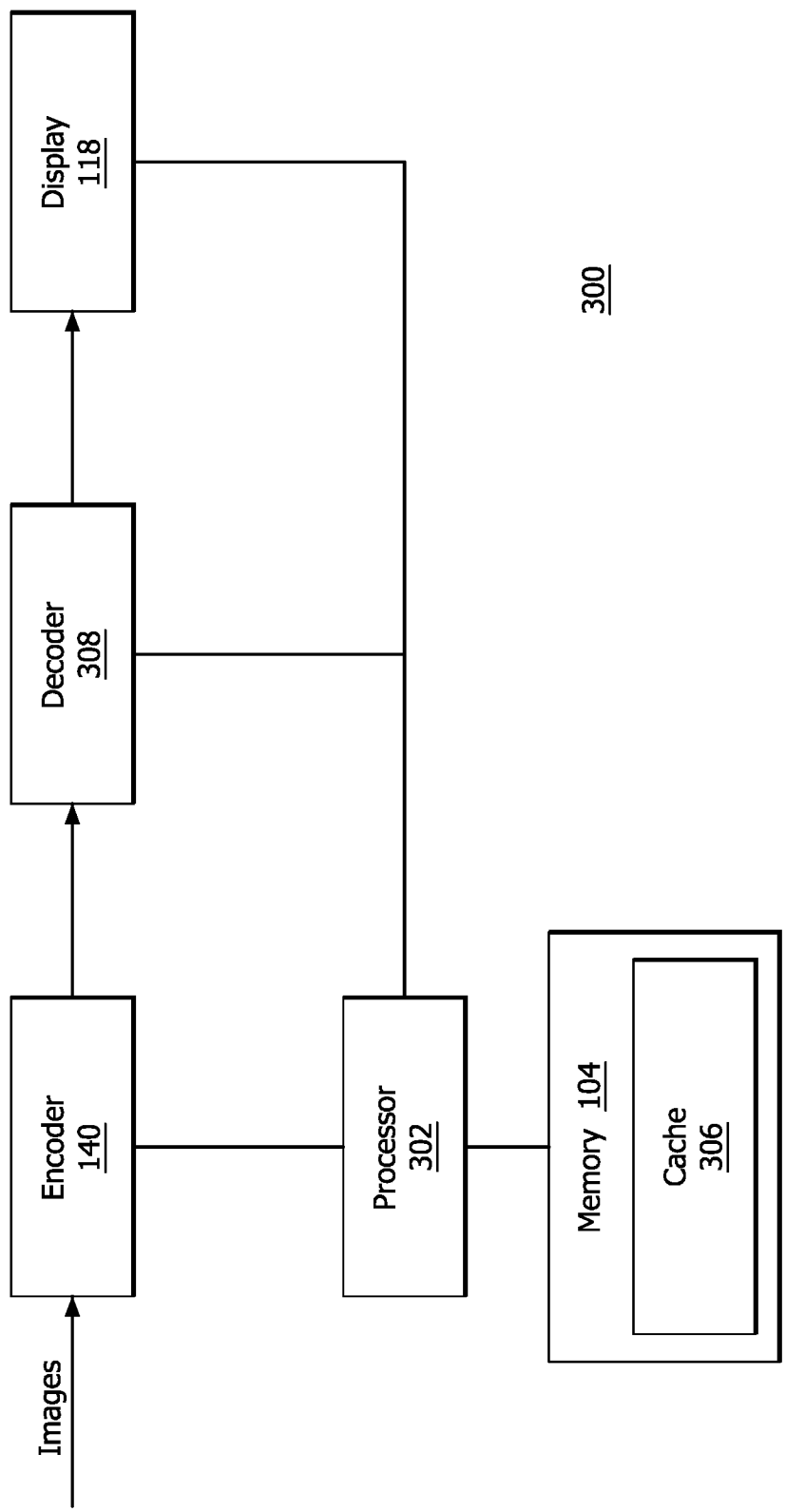
FIG. 3 is a block diagram illustrating exemplary components of a processing device in which one or more features of the disclosure can be implemented.

FIG. 3 is a block diagram illustrating exemplary components of a processing device 300 in which one or more features of the disclosure can be implemented. Processing device 300 is used to process and compress panoramic video images as described in more detail below. As shown in FIG. 3, processing apparatus 300 comprises processor 302, memory 104, including cache 306, encoder 140, decoder 308 and display 118.

As shown in FIG. 3, processor 302 is in communication with encoder 140, transmitter 304 and memory 104, which includes cache 306. Encoder 140 is configured to receive video images and encode the images to be decoded by decoder 308 and displayed at display device 118. The images can be received from one or more sources, such as a video capture device (e.g., a camera), a storage device (e.g., storage 106), a video content provider, and a device for generating graphics (e.g., APD 116).

Processor 302 is, for example, APD 116 (shown in FIGS. 1 and 2). Processor 302 is configured to perform various functions, as described in detail herein, for implementing features of the present disclosure. Processor 302 is configured to receive frames of image data, comprising a plurality of sub-frame portions (e.g., slices or tiles), and process, using layers of a CNN, the frames of image data on a sub-frame portion basis.

For example, processor 302 is configured to schedule a first sub-frame portion of a first frame to be processed by a layer of the CNN when the first sub-frame portion is available for processing, process the first sub-frame portion by the layer, determine when there is sufficient image data available for the layer to continue processing of the first sub-frame portion and continue the processing of the first sub-frame portion when it is determined that there is sufficient image data available for the layer to continue processing of the first sub-frame portion. Sufficient image data is determined to be available, for example, when a second sub-frame portion is available for processing by the layer of the CNN.

Processing of the image data on a sub-frame portion basis is facilitated by indications communicated between the scheduler 136 and compute units 132, which are implemented as two separate hardware blocks. The indications include an indication of the availability of the input data (e.g., slice or tile) provided from scheduler 136 to a compute unit 132 and an indication of the availability of output data provided from a compute unit 132 to the scheduler 136. When available of new data is indicated to the scheduler 136, the scheduler 136 uses the direct acyclic graphic (DAG) of the inference network to determine which of the nodes or operators (e.g., vertices of primitives) in the DAG are to be scheduled. When the node (operator) is identified, the scheduler 136 indicates an availability (e.g., buffer availability) to the compute unit 132 associated with the node (i.e., operator) processing. After the data is processed, when the compute unit 132 determines that sufficient data is available for output, the compute unit 132 indicates the availability, of new output data, to the scheduler 136. Similarly, scheduler 136 determines the nodes (i.e., operators) downstream of the output data. Scheduler 136 schedules the determined nodes for execution in compute units 132.

The encoded image data is sent, to decoder 308 for example, via a network interface controller (NIC) over one or more networks (e.g., local area network), including wired (e.g., Ethernet) or wireless networks (e.g., via WiFi, Bluetooth, and other wireless standards). Alternatively, the encoded image data is sent to decoder 308 on the same processing device 300 (e.g., via a local device bus).

The processed image data is provided to display device 118 for displaying the image data. The display device 118, is for example, a head mounted display, a computer monitor, TV display, a display in an automobile or another display device configured to display image data.

Figure 4:
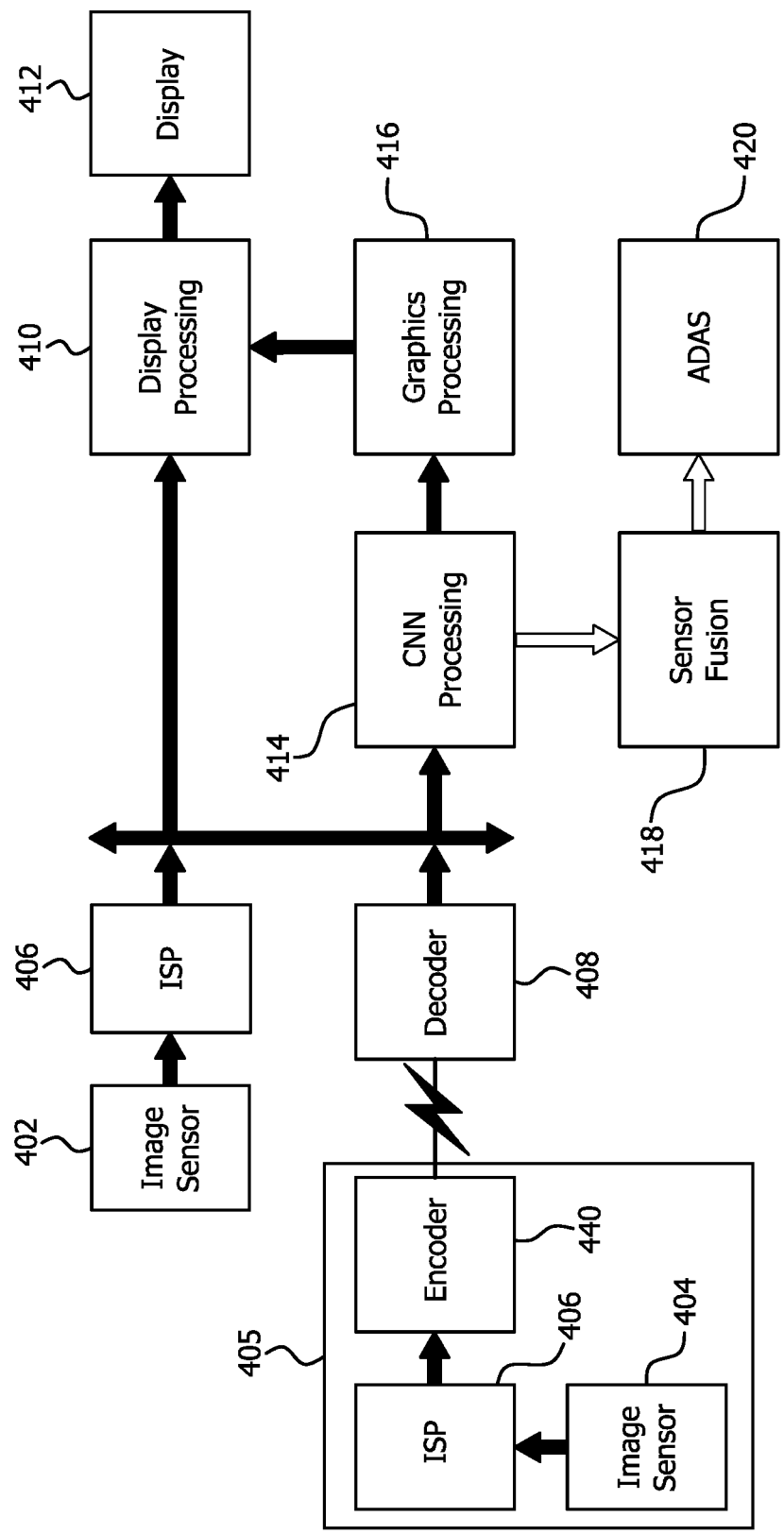
FIG. 4 is a block diagram illustrating an example flow for processing image data for an automotive application according to features of the disclosure.

FIG. 4 is a block diagram illustrating an example flow for processing image data for an automotive application according to features of the disclosure. The components and flow shown in FIG. 4 are merely used as an example of implementing features of the disclosure. Features of the disclosure can be implemented for processing various types of applications (e.g., time sensitive applications), such as applications used for virtual reality, augmented reality, head-mounted displays, automotive perception systems and advanced driver assistance systems.

As shown in FIG. 4, image data is provided by image sensor 402 and image sensor 404. Image sensors 402 and 404 are, for example, a charge-coupled device (CCD) or metal-oxide-semiconductor (MOS) active-pixel sensor. The image sensors 402 and 404 are comprised of individual photosensors, each corresponding to a pixel of an image, which capture the intensity (i.e., brightness information) of received light. The image sensors 402 and 404 can also include a color filter array, comprised of individual color filters overlaying the photosensors, to render color information unable to be captured by the photosensors. The image sensors 402 and 404 are configured detect and convert captured images (e.g., light waves or electromagnetic radiation) into a continuous stream of image data (i.e., raw image data).

Image signal processor (ISP) 406 receives the raw image data from image sensor 402 and performs a variety of processing tasks on the raw image data, such as color interpolation (e.g., interpolating red-green-blue (RGB) values of pixels), color correction, gamma correction (i.e., changing from linear to non-linear space) and conversion to a common image format (e.g., transforming from an RGB color format to a YUV format).

In the example shown in FIG. 4, image sensor 404 is part of a device (e.g., camera) 405 which includes ISP 406 and encoder 440. The encoded (e.g., compressed) image data is provided to the decoder 408 and decoded (decompressed). The encoded image data is sent, to decoder 408, for example, via a network interface controller (NIC) over one or more networks (e.g., local area network), including wired (e.g., Ethernet) or wireless networks (e.g., via WiFi, Bluetooth, and other wireless standards). Alternatively, the encoded image data is sent to decoder 408 on the same device (e.g., via a local device bus). Encoder 440 and decoder 408 are configured to encode and decode the image data according to any of various encoding formats (e.g., Motion JPEG, Advanced Video Coding (AVC), High Efficiency Video Coding (HEVC), or other formats).

As shown in FIG. 4, the processed image data is provided by ISP 406 for display processing, at block 410, and for CNN processing, at block 414. The image data, decoded by decoder 408, is also provided for CNN processing at block 414.

The image data, provided for CNN processing, includes a plurality frames (images) each comprising sub-frame portions (e.g., slices or tiles).

The CNN processing 414 includes processing the frames of image data, on a sub-frame portion basis, by layers of a CNN. For example, the CNN processing 414 includes scheduling a first sub-frame portion of a first frame to be processed by a first layer of the CNN when the first sub-frame portion is available for processing, processing the first sub-frame portion by the first layer and continuing the processing of the first sub-frame portion by the first layer when it is determined that there is sufficient image data available for the first layer to continue processing of the first sub-frame portion. For example, sufficient image data is determined to be available for the first layer to continue processing the first sub-frame portion when a second sub-frame portion is available for processing by the first layer.

As described in more detail below with regard to FIG. 5, because the image data is processed by layers of a CNN 502 on a sub-frame portion basis (e.g., slice basis), the amount of time incurred to produce the inference output data for the frames is less than the amount of time incurred to produce the inference output data when the image data is processed by layers of the CNN 502 on a frame basis.

The inference output data, from the CNN processing 414, for the image data captured by image sensors 402 and 404 is provided for sensor fusion at block 418. That is the image data captured by image sensors 402 and 404 is combined (e.g., fused) such that information resulting from the combined data is more certain (e.g., more accurate, more complete, or more dependable) for making additional calculations.

For example, as shown in FIG. 4, the information resulting from the fused data is provided for additional processing by an advanced driver-assistance system (ADAS), at block 420. That is, the information resulting from the fused data is used by the ADAS to assist drivers in driving and parking functions (e.g., to detect nearby obstacles or driver errors, and respond accordingly).

In addition, the inference output data, from the CNN processing 414, for the image data captured by image sensors 402 and 404 is provided for graphics processing, at block 416, which includes converting rendering commands into pixel image data.

The pixel image data is provided for display processing, at block 410, which includes controlling (e.g., composing and converting) the pixel image data to an output signal driving display device 412. The images are then displayed on the display device 412. The display device 412 is, for example, a display in an automobile.

The CNN processing 414, the graphics processing 416, sensor fusion 418 and display processing 410 can be implemented by a single processing device (e.g., APD 116. Alternatively, one or more of CNN processing 414, graphics processing 416, sensor fusion 418 and display processing 410 can be implemented by a separate processor.

Figure 5:
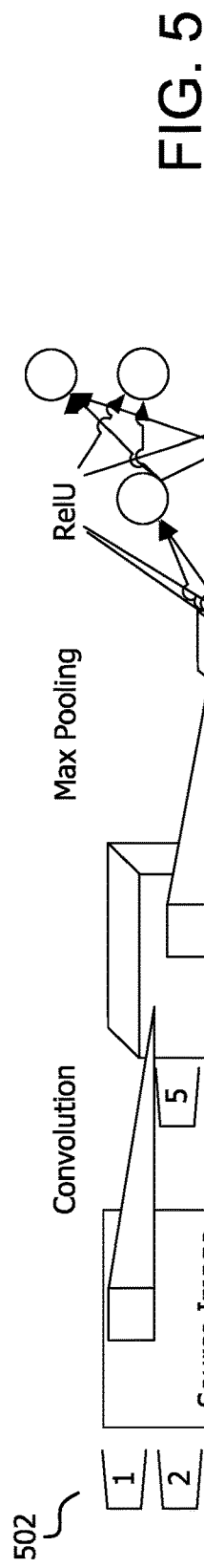
FIG. 5 is a timing diagram illustrating a comparison of frame-based processing and slice-based processing using a convolutional neural network.

FIG. 5 is a timing diagram 500 illustrating a comparison of frame-based processing and slice-based processing by layers of a CNN 502. FIG. 5 illustrates a reduction in processing latency between frame-based processing and slice-based processing implemented according to features of the disclosure. For simplification purposes, in the example shown in FIG. 5, frames are divided into 4 slices. Features of the disclosure can be implemented by dividing frames into any sub-frame portions comprising any number of pixels (e.g., dividing into tiles). In addition, frames can include any number of sub-frame portions. For simplified explanation purposes, the CNN 502 shown in FIG. 5 includes a convolutional layer, a max pooling layer and a rectified linear unit (RelU) layer. Features of the disclosure can be implemented by processing image data on a sub-frame portion basis using any number of layers of a CNN, including layers other than a convolutional layer, a max pooling layer and a RelU layer.

The top portion of FIG. 5 illustrates an example of different processing layers of a CNN 502 used to process slices of image data according to the timing diagram shown in FIG. 5. The first row of the timing diagram in FIG. 5 shows each slice of the image data arriving for processing (e.g., arriving in a buffer). The second row of the timing diagram in FIG. 5 shows processing of the image data according to frame-based scheduling. The third row of the timing diagram in FIG. 5 shows processing of image data according to slice-based scheduling.

When a slice is available for processing (e.g., each portion of pixel data for the slice arrives in the buffer), the slice is scheduled for processing by a layer and processing begins for the slice. For example, as shown in the first row of the timing diagram, slice 1 of frame 1 is available for processing at time t1. Accordingly, slice 1 is scheduled and, as shown in the third row, the convolution layer begins processing slice 1 at time t1. Slice 2 of frame 1 is available for processing at time t2. Accordingly, slice 2 is scheduled and the convolution layer begins processing slice 2 at time t2.

When it is determined that there is sufficient data available for a layer to continue processing, the layer continues processing of the data. For example, when it is determined that slice 1 and slice 2 are available for processing (e.g., available in memory) by the convolution layer, at time t3, the convolution layer continues processing by performing a convolution on slice 1 and slice 2, the output of which is convolved slice 5. Slice 5 is then provided to the next layer (e.g., max pooling layer) for processing.

Although slice 3 is not yet available for processing at time t3, processing (i.e., convolution) is performed on slice 1 and 2 at time t3. Accordingly, the time period between t3 and t4, which would otherwise have been wasted (i.e., no processing being performed), is utilized by performing processing on image data (i.e., convolution of slice 1 and slice 2) during the time period.

As shown in the first row of the timing diagram, slice 3 of frame 1 is available for processing at time t4. Accordingly, slice 3 is scheduled and, as shown in the third row, the convolution layer begins processing slice 3, at time t4. Slice 4 of frame 1 is available for processing at time t5. Accordingly, slice 4 is scheduled and the convolution layer begins processing slice 4 at time t5.

When it is determined that slice 3 and slice 4 are available for processing (e.g., available in memory) by the convolution layer, at time t6, the convolution layer continues processing by performing a convolution on slice 3 and slice 4, the output of which is convolved slice 6. Slice 6 is then provided to the next layer (e.g., max pooling layer) for processing.

Likewise, when it is determined that slice 5 and slice 6 are available for processing by the max pooling layer, at time t6, the max pooling layer continues processing by performing a max pool layer operation on slice 5 and slice 6, the output of which is a convolved, max pooled slice 7. Slice 7 is then provided to the next layer (e.g., RelU layer) for processing. When processing of slice 7 by the RelU layer is completed, inference slices 8 and 9 are determined for the image.

When sub-frame portions for multiple frames are available for processing, the sub-frame portion of a first frame, in which data was processed by the layer prior to any data of a second frame being processed by the layer, is scheduled to be processed by the layer before the sub-frame portion of the second frame is scheduled to be processed by the layer. For example, as shown in FIG. 5, when data (i.e., slices 5 and 6) for frame 1 are available at time t7, and data (i.e., slice 1) for frame 2 is available for processing, at time t7, slices 5 and 6 of frame 1 are scheduled and processed prior to scheduling and processing slice 1 of frame 2. In addition, when data (i.e., slices 7 to 9) for frame 1 are available, slices 7 to 9 of frame 1 are also scheduled and processed prior to scheduling and processing slice 1 of frame 2. That is, although the image data is processed on a sub-frame portion basis, the scheduling of sub-frame portions for processing is prioritized based on the temporal order of the initial processing of any data for the frames.

In the example shown in FIG. 5, each of the slices (i.e., slice 1 to slice 9) of frame 1 are scheduled and processed by a layer (e.g., convolutional layer, max pooling layer and RelU layer) of the CNN 502 prior to any slices of frame 2 being scheduled for processing by one of the layers of the CNN 502. When a sub-frame portion of the second frame is available for processing by a layer, however, but no sub-frame portion of the first frame is available for processing by a layer, the sub-frame portion of the second frame is scheduled for processing by the layer such that time is not wasted when image data is available for processing. When sub-frame portions for the first frame and second frame are available for processing upon completion of the processing of the sub-frame portion the second frame, the sub-frame portion of the first frame is again prioritized and is scheduled for processing by the layer.

That is, as described above with regard to FIG. 5, the scheduling of sub-frame portions for processing is prioritized based on the temporal order of the initial processing of any data for the frames. The process described above is implemented for a first layer and each subsequent layer of the CNN such that processing by each layer can begin as soon as sufficient data is available for each layer.

Because the image data is processed by layers of a CNN 502 on a sub-frame portion basis (e.g., slice basis), the amount of time incurred to produce the inference output data for the frames is less than the amount of time incurred to produce the inference output data when the image data is processed by layers of the CNN 502 on a frame basis.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, 302, the input driver 112, the input devices 108, the output driver 114, the output devices 110, the accelerated processing device 116, the scheduler 136, the compute units 132, the SIMD units 138, encoder 140 and 440, decoder 308 and 408, display 118 and 412, image sensors 402 and 404 and ISP 406 may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. An image processing method comprising:
receiving a plurality of frames of image data, the plurality of frames comprising sub-frame portions of image data;
scheduling a first sub-frame portion of a first frame to be processed by a first layer of a convolutional neural network when the first sub-frame portion is available for processing;
processing the first sub-frame portion by the first layer; and
continuing the processing of the first sub-frame portion by the first layer when it is determined that there is sufficient image data available for the first layer to continue processing of the first sub-frame portion.

2. The method of claim 1, wherein the plurality of frames of image data are divided into a plurality of sub-frame portions, and
the sub-frame portions are one of slices and tiles.

3. The method of claim 1, wherein the first sub-frame portion comprises data for a plurality of pixels, and
the first sub-frame portion is available for processing when data for each of the pixels of the first sub-frame portion is in memory.

4. The method of claim 1, further comprising determining that there is sufficient image data available for the first layer to continue processing the first sub-frame portion when a second sub-frame portion is available for processing by the first layer.

5. The method of claim 4, wherein the first layer of the convolutional neural network is a convolution layer, and
the processing of the first sub-frame portion by the convolutional layer is continued by convolving the first sub-frame portion and the second sub-frame portion.

6. The method of claim 1, wherein the convolutional neural network comprises a plurality of different layers,
a sub-frame portion of the first frame is processed prior to any sub-frame portion of a second frame being processed, and
when the sub-frame portion of the first frame and a sub-frame portion of the second frame are concurrently available for processing by any of the different layers, the sub-frame portion of the first frame is scheduled for processing prior to scheduling the sub-frame portion of the second frame for processing.

7. The method of claim 6, wherein when the sub-frame portion of the second frame is available for processing by the first layer, but no sub-frame portions of the first frame are available for processing by the first layer, the sub-frame portion of the second frame is processed by the first layer, and
after the processing of the sub-frame portion the second frame is completed and when an additional sub-frame portion of the first frame and an additional sub-frame portion of the second frame are concurrently available for processing, the additional sub-frame portion of the first frame is scheduled for processing by the first layer.

8. The method of claim 1, wherein the convolutional neural network comprises a plurality of different layers which comprise a convolution layer, a max pooling layer and a rectified linear unit layer.

9. The method of claim 8, further comprising:
processing the plurality of frames of image data on a sub-frame portion basis using the plurality of different layers; and
displaying the plurality of frames of image data.

10. An image processing device comprising:
memory; and
a processor configured to:
receive a plurality of frames of image data, the plurality of frames comprising sub-frame portions of image data;
schedule a first sub-frame portion of a first frame to be processed by a first layer of a convolutional neural network when the first sub-frame portion is available for processing;
process the first sub-frame portion by the first layer; and
continue the processing of the first sub-frame portion by the first layer when it is determined that there is sufficient image data available for the first layer to continue processing of the first sub-frame portion.

11. The image processing device of claim 10, wherein the plurality of frames of image data are divided into a plurality of sub-frame portions, and
the sub-frame portions are one of slices and tiles.

12. The image processing device of claim 10, wherein, wherein the first sub-frame portion comprises data for a plurality of pixels, and
the first sub-frame portion is available for processing when data for each of the pixels of the first sub-frame portion is in memory.

13. The image processing device of claim 10, wherein the processor is configured to determine that there is sufficient image data available for the first layer to continue processing the first sub-frame portion when a second sub-frame portion is available for processing by the first layer.

14. The image processing device of claim 13, wherein the first layer of the convolutional neural network is a convolution layer, and
the processing of the first sub-frame portion by the convolutional layer is continued by convolving the first sub-frame portion and the second sub-frame portion.

15. The image processing device of claim 10, wherein the convolutional neural network comprises a plurality of different layers,
a sub-frame portion of the first frame is processed prior to any sub-frame portion of a second frame being processed, and
when the sub-frame portion of the first frame and a sub-frame portion of the second frame are concurrently available for processing by any of the different layers, the processor is configured to schedule the sub-frame portion of the first frame for processing prior to scheduling the sub-frame portion of the second frame for processing.

16. The image processing device of claim 15, wherein when the sub-frame portion of the second frame is available for processing, but no sub-frame portions of the first frame are available for processing, the processor is configured to schedule the sub-frame portion of the second frame for processing by one of the different layers, and
after the processing of the sub-frame portion the second frame is completed and when an additional sub-frame portion of the first frame and an additional sub-frame portion of the second frame are concurrently available for processing, the processor is configured to schedule the additional sub-frame portion of the first frame for processing by one of the different layers.

17. The image processing device of claim 10, wherein the convolutional neural network comprises a plurality of different layers which comprise a convolution layer, a max pooling layer and a rectified linear unit layer.

18. The image processing device of claim 17, further comprising a display device, wherein the plurality of frames of image data are processed on a sub-frame portion basis using the plurality of different layers; and the plurality of frames of image data are displayed at the display device.

19. A non-transitory computer readable medium comprising instructions for causing a computer to execute a video encoding method comprising:

receiving a plurality of frames of image data, the plurality of frames comprising sub-frame portions of image data;

scheduling a first sub-frame portion of a first frame to be processed by a first layer of a convolutional neural network when the first sub-frame portion is available for processing;

processing the first sub-frame portion by the first layer; and continuing the processing of the first sub-frame portion by the first layer when it is determined that there is sufficient image data available for the first layer to continue processing of the first sub-frame portion.

20. The non-transitory computer readable medium of claim 19, wherein the plurality of frames of image data are divided into a plurality of sub-frame portions, and the sub-frame portions are one of slices and tiles.

21. The method of claim 1, wherein when a second sub-frame portion is available for processing by the first layer, scheduling of sub-frame portions for processing is prioritized based on a temporal order of initial processing of any data for the frames.

* * * * *